United States Patent
Lee et al.

(10) Patent No.: US 11,460,923 B2
(45) Date of Patent: Oct. 4, 2022

(54) ACOUSTIC AUGMENTATION OF HAPTIC VIBRATION WITH CORRELATED SOUNDS

(71) Applicant: Maxim Integrated Products, Inc., San Jose, CA (US)

(72) Inventors: Sangwon Lee, Pleasanton, CA (US); Vivek Prakash Nigam, Dublin, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 98 days.

(21) Appl. No.: 16/942,768

(22) Filed: Jul. 30, 2020

(65) Prior Publication Data

US 2021/0034157 A1 Feb. 4, 2021

Related U.S. Application Data

(60) Provisional application No. 62/881,799, filed on Aug. 1, 2019.

(51) Int. Cl.
- *G06F 3/01* (2006.01)
- *G06F 3/041* (2006.01)
- *H04R 1/02* (2006.01)
- *H04R 3/00* (2006.01)

(52) U.S. Cl.
CPC .............. *G06F 3/016* (2013.01); *G06F 3/041* (2013.01); *H04R 1/028* (2013.01); *H04R 3/00* (2013.01); *H04R 2400/03* (2013.01); *H04R 2499/15* (2013.01)

(58) Field of Classification Search
CPC .......... G06F 3/016; G06F 3/041; G06F 3/043; H04R 1/028; H04R 3/00; H04R 2400/03; H04R 2499/11; H04R 2499/15
See application file for complete search history.

(56) References Cited

U.S. PATENT DOCUMENTS

| | | | |
|---|---|---|---|
| 7,215,329 B2 | 5/2007 | Yoshikawa et al. | |
| 10,754,428 B1* | 8/2020 | Parise | H04R 3/04 |
| 2010/0141408 A1 | 6/2010 | Doy et al. | |
| 2016/0277843 A1* | 9/2016 | Babayoff | H04R 17/025 |
| 2019/0064925 A1* | 2/2019 | Kim | A63F 13/24 |

OTHER PUBLICATIONS

Bishop Rock, LLC Technical Intelligence, MAXM-2076P Validity Search Report, Acoustic Augmentation of Haptic Vibration with Correlated Sounds, dated Apr. 30, 2020, (22 pgs).

\* cited by examiner

*Primary Examiner* — Nelson M Rosario
(74) *Attorney, Agent, or Firm* — North Weber & Baugh LLP; Michael V. North

(57) ABSTRACT

Described herein are system and method embodiments of acoustic augmentation of haptic vibration with correlated sounds. Embodiments of a haptic driven signal crossing both vibration band and acoustic band are disclosed. The driven signal at the acoustic band enables a haptic in an electronic device to provide an audio augmentation for haptic vibration independent from a loudspeaker of the electronic device. Upon a touch on a touch surface is detected, a vibration request is generated based on the touch and user preferences. A pattern generator is used to generate a vibration signal based on the vibration request to drive a haptic vibrator for desired vibration and acoustic sound patterns.

17 Claims, 5 Drawing Sheets

100

ACOUSTIC AUGMENTATION OF HAPTIC VIBRATION WITH CORRELATED SOUNDS

CROSS REFERENCE TO RELATED APPLICATION

The application claims the benefit under 35 U.S.C. § 119(e) of Provisional Application Ser. No. 62/881,799, entitled "ACOUSTIC AUGMENTATION OF HAPTIC VIBRATION WITH CORRELATED SOUNDS", filed on Aug. 1, 2019, and listing Sangwon Lee and Vivek Prakash Nigam as the inventors. The aforementioned patent document is incorporated by reference herein in its entirety.

BACKGROUND

A. Technical Field

The present invention relates generally to haptic generation for electronic devices, especially acoustic augmentation of haptic vibration with correlated sounds.

B. Background of the Invention

One trend for modern portable electronic devices is the pursuit of bigger screen. As a result, mechanical buttons have been replaced by software (SW) based buttons in many electronic devices, such as smartphones, to maximize display area. To make the experience of using SW buttons same as mechanical buttons, a haptic resonator provides a tactile feedback to the user. However, current haptic vibrators do not provide a real mechanical sound along with haptic feedback. Consequently, user experience is compromised.

It would be desirable to have acoustic augmentation of haptic vibration with correlated sounds for enhanced user experience.

SUMMARY OF THE INVENTION

Embodiments of the invention relate to systems and methods for acoustic augmentation of haptic vibration with correlated sounds for electronic devices.

Embodiments of a haptic driven signal crossing both vibration band and acoustic band are disclosed. Applied such a multi-band driven signal, the haptic vibrator is able to generate a sound feedback. Such a sound feedback generation method does not relay on the loudspeaker and therefore is immune from challenges associated with using loudspeaker for sound feedback.

In one or more embodiments, the driven signal in the audio band may be adjusted, in term of amplitude, bandwidth, waveform profile, etc., separately from the driven signal in the vibration band. In one or more embodiments, those parameters may be adjusted independently from settings for loudspeakers; therefore a user may be able to customize the acoustic argument for haptic feedback according to the user's own preference for mechanical sound pattern, intensity, etc.

Embodiments of a flow process of acoustic augmentation for haptic vibration are disclosed. Upon a contact or touch on a touch surface being detected, a touch signal is generated and output to a haptic event generator, which generates a vibration request based on the touch signal and user preferences. For example, the contact or touch may constitute a contact or touch by a user on the touch surface using a finger, a stylus or other structure that can be detected by the touch surface to generate the touch signal. A pattern generator is then used to generate a vibration signal based on the vibration request to drive a haptic vibrator for desired vibration and acoustic sound patterns.

One skilled in the art will recognize that various methods of acoustic augmentation of haptic vibration with correlated sounds may be implemented in an electronic device. One skilled in the art will further recognize that an electronic device may utilize different sound patterns for acoustic augmentation, all of which may be useful in generating an acoustic enhanced user haptic feedback and should fall within the scope of the present invention.

BRIEF DESCRIPTION OF THE DRAWINGS

Reference will be made to exemplary embodiments of the present invention that are illustrated in the accompanying figures. Those figures are intended to be illustrative, rather than limiting. Although the present invention is generally described in the context of those embodiments, it is not intended by so doing to limit the scope of the present invention to the particular features of the embodiments depicted and described.

Figure 1:
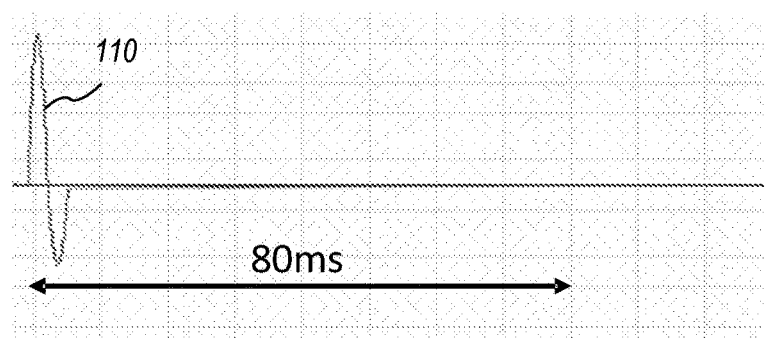
FIG. 1 depicts a typical driving signal for a haptic vibrator in an electronic device.

One skilled in the art will recognize that various implementations and embodiments of the invention may be practiced in accordance with the specification. All of these implementations and embodiments are intended to be included within the scope of the invention.

DETAILED DESCRIPTION OF THE PREFERRED EMBODIMENTS

In the following description, for the purpose of explanation, specific details are set forth in order to provide an understanding of the present invention. The present invention may, however, be practiced without some or all of these details. The embodiments of the present invention described below may be incorporated into a number of different electrical components, circuits, devices, and systems. Structures and devices shown in block diagram are illustrative of exemplary embodiments of the present invention and are not to be used as a pretext by which to obscure broad teachings of the present invention. Connections between components within the figures are not intended to be limited to direct connections. Rather, connections between components may be modified, re-formatted, or otherwise changed by intermediary components.

Components, or modules, shown in diagrams are illustrative of exemplary embodiments of the invention and are meant to avoid obscuring the present disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

When the specification makes reference to "one embodiment" or to "an embodiment", it is intended to mean that a particular feature, structure, characteristic, or function described in connection with the embodiment being discussed is included in at least one contemplated embodiment of the present invention. Thus, the appearance of the phrase, "in one embodiment," in different places in the specification does not constitute a plurality of references to a single embodiment of the present invention.

The use of certain terms in various places in the specification is for illustration and should not be construed as limiting. A function or resource is not limited to a single function or resource; usage of these terms may refer to a grouping of related functions or resources, which may be distributed or aggregated. The terms "include," "including," "comprise," and "comprising" shall be understood to be open terms and any lists the follow are examples and not meant to be limited to the listed items.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

Various embodiments of the invention are used for haptic augmentation in electronic devices for enhanced user experience. System and method Embodiments of a haptic augmentation using at least one of visual and touch inputs are disclosed. Depending on application in an electronic device, the haptic augmentation may be configured in various ways for enhanced user experience.

Many portable electronic devices, e.g. smartphones, use software (SW) based buttons to replace mechanical buttons to maximize display area. To make the experience of using SW buttons same as mechanical buttons, a haptic resonator provides a tactile feedback to the user.

As described herein a haptic vibrator may constitute any device, actuator or transducer configured to generate a vibration (e.g., a haptic vibration) in response to an electrical signal applied to the device, actuator or transducer. Haptic vibrators have been used widely in electronic devices, such as smartphones, etc., as a way to provide haptic feedback for enhanced user experience. Haptic vibrators may have different types, such as eccentric rotating mass (ERM) actuators, linear resonant actuators (LRAs), piezoelectric actuators. An ERM actuator uses an unbalanced weight attached to a motor shaft. As the shaft rotates, the spinning of this irregular mass causes the actuator and the attached device to shake. For LRA vibrators, a mass is moved in a reciprocal manner driven by an AC electrical signal via a magnetic voice coil, similar to motion transfer in a cone of a loudspeaker. LRAs are very efficient and allow more precise and complex vibrations for an improved experience. Unlike ERMs, the vibration oscillates linearly. Additionally, LRAs may decouple amplitude and frequency and thus are capable of amplitude adjusting without affecting frequency. Piezoelectric actuators may provide precise motions with less noise and in a smaller platform, but require relatively higher driven voltages compared to ERMs and LRAs.

FIG. 1 depicts a typical driving signal for a haptic vibrator in an electronic device. In response to the driving signal 110, the haptic vibrator vibrates, but does not provide a real mechanical sound along with haptic feedback. Consequently, user experience is compromised. To provide a sound feedback, some electronic device may use a loud speaker to simulate a mechanical sound. However, such an approach has to face several challenges. First, the loud speaker may be silenced at the system level. Second, the volume of the loud speaker is adjusted constantly and may not be set at a proper level when a user is pressing a software button. Third, the loud speaker may be used for playing some sounds when the user is pressing the software button. The sounds the loud speaker is playing may have some interference with the simulated mechanical sounds, or cause the mechanical sounds distorted.

Figure 2:
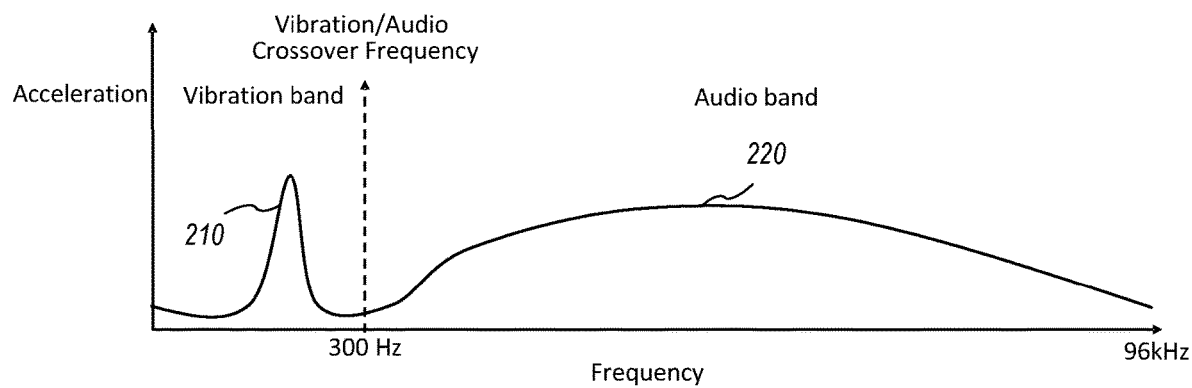
FIG. 2 depicts an acceleration response for a haptic vibrator according to various embodiments of the invention.

FIG. 2 depicts an acceleration response for a LRA haptic vibrator according to various embodiments of the invention. It is clearly shown that the LRA haptic vibrator may respond to driven signal beyond typical vibration band (below 300 Hz). The response comprises a response 210 with a narrow peak around a vibration resonant frequency in a vibration band and a relatively flatter response 220 in audio band. Although the LRA haptic vibrator may respond in an audio band, the LRA haptic vibrator is typically driven by a driven signal focused on a vibration band only or mostly focused on the vibration band.

Figure 3:
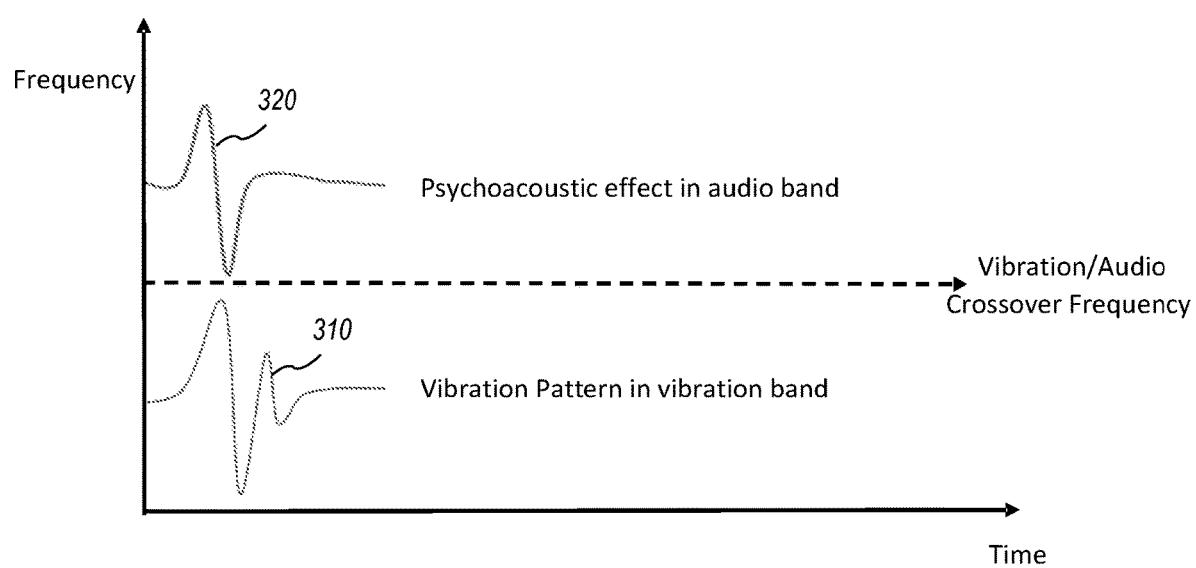
FIG. 3 depicts a driven signal for a haptic vibrator in a dual band for acoustic augmentation of haptic vibration according to various embodiments of the invention.

In order to enable the haptic vibrator to generate both haptic feedback and a "mechanical sound" feedback, an embodiment of a driven signal in a dual band is applied to a haptic vibrator for acoustic augmentation of haptic vibration, as shown in FIG. 3. The driven signal, shown in a frequency-time plot, comprises a first component 310 in a vibration band for a desired vibration pattern and a second component 320 in an audio band for a desired sound pattern. Applied such a multi-band driven signal, the haptic vibrator is able to generate a sound feedback. Such a sound feedback generation method does not relay on the loudspeaker and therefore is immune from the aforementioned challenges associated with using loudspeaker for sound feedback.

In one or more embodiments, the driven signal in the audio band may be adjusted, in term of amplitude, bandwidth, waveform profile, etc., separately from the driven signal in the vibration band. In one or more embodiments, a user would be able to adjust those parameters independent of settings for loudspeakers, therefore be able to customize the acoustic argument for haptic feedback according to the user's own preference for mechanical sound pattern, intensity, etc.

In one or more embodiments, a pattern database may be established store a plurality of haptic patterns (or driven signal patterns) for one or more haptic vibrators corresponding to various mechanical sounds. Each haptic pattern may comprise a signal in at least an audio band related to a specific mechanical sound for a specific vibrator. Such a database may be a third-party database provided by a vibrator manufacturer or a smartphone manufacturer. The database may be hosted in a server or a cloud database accessible by the electronic device. Alternatively, the pattern database, or part of the database may be stored within the electronic device for user selection.

Figure 4:
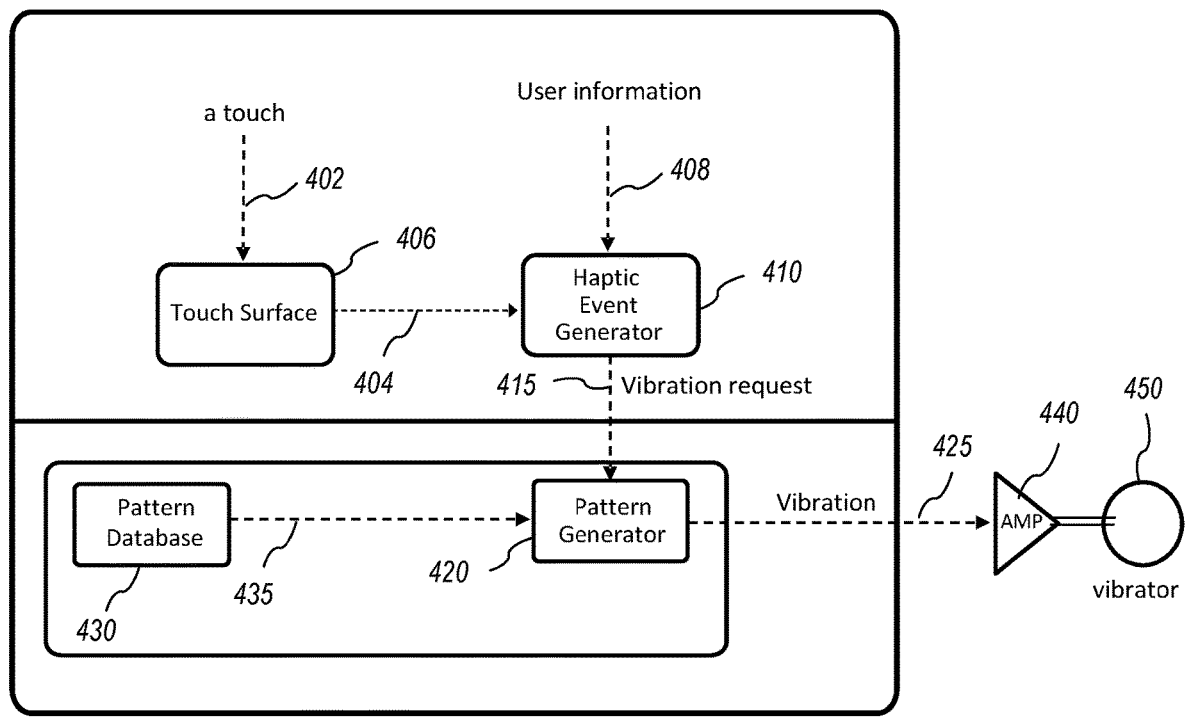
FIG. 4 depicts a block diagram for a system of acoustic augmentation for haptic vibration according to various embodiments of the invention.

FIG. 4 depicts a block diagram for a system of acoustic augmentation for haptic vibration according to various embodiments of the invention. The haptic augment system 400 may be hosted in an electronic device, such as a smartphone or a wearable gaming electronic device, for operation. The system comprises at least a touch surface 406, a haptic event generator 410, a pattern generator 420. The touch surface may be a touch screen, a projected surface, or even a virtual surface, etc. In one or more embodiments, the touch surface 406 may display or comprise one or more software buttons (or virtual buttons) and receive a touch 402.

In one or more embodiments, the touch may be sensed by the touch surface itself (e.g. a touch screen). In one or more embodiments, the touch may be sensed via other means, e.g. via position and/or motion detection. One of ordinary skill in the art shall understand that various approaches, such as using camera sensors, ultrasound sensors, infrared sensors, etc., may be used for motion or position detection. In one or more embodiments, upon a contact or touch (e.g., by a finger of a user) to one or more software buttons being detected, a touch signal 404 is generated (by the touch surface itself or other mechanisms) and sent to the haptic event generator 410. In one or more embodiment, the touch signal may comprise information of touch area (e.g. the software button) and the touch information, such as touch force, touch time span. For example, some electronic devices support force touch or 3D touch to distinguish between various levels of force being applied to their surfaces. Therefore, different touches applied to the same software buttons may trigger different haptic responses.

In one or more embodiments, the haptic event generator 410 may be configured to receive user information 408, which may include user preference including but not limited to type, strength, etc. of mechanical sounds. The haptic event generator 410 receives the touch signal 304 and the user information 408 to output a vibration request 415 to the pattern generator 420. In one or more embodiments, the vibration request 415 may comprise information for desirable vibration and desirable acoustic information for feedback.

In one or more embodiments, the pattern generator 420 outputs a vibration signal 425, which is first amplified by a vibration amplifier 440, and then used for drive the haptic vibrator 450. In one or more embodiments, the vibration signal 425 is a multi-band signal across both a vibration band and an acoustic band. In one or more embodiments, the vibration signal in the vibration band and the vibration signal the acoustic band may be generated independently and then synthesized or combined together. In one or more embodiments, the vibration signal in the vibration band and the vibration signal the acoustic band may be generated altogether. Various methods may be implemented to mix the vibration and the audio components. In one embodiment, the vibration and the audio components are synthesized together in a same time slot, with expectation the same latency for two different components. Such a mixing approach may generate crosstalk noise. In another embodiment, the vibration and the audio components are put into different time slots. For instance, a vibration pattern may be added right after/before a sound. The gap between the vibration and the sound may be configured short enough that a user may not practically feel latency. Considering the difference of human recognition latency between sound and touch, it may not be very necessary to mix two signals in a same time slot, therefore crosstalk noise may be eliminated or significantly reduced.

In one or more embodiments, the pattern generator 420 may further couple to a pattern database 430 storing a plurality of haptic patterns (or driven signal patterns) for one or more haptic vibrators corresponding to various "mechanical sounds". The pattern generator 420 may select one or more haptic patterns 435 based on the vibration request 415 and output the vibration signal 425 based on the selected one or more haptic patterns. In one or more embodiments, the pattern generator 420 may generate one or more haptic patterns locally based on the vibration request 415 and outputs the vibration signal 425 based on the generated one or more haptic patterns.

Figure 5:
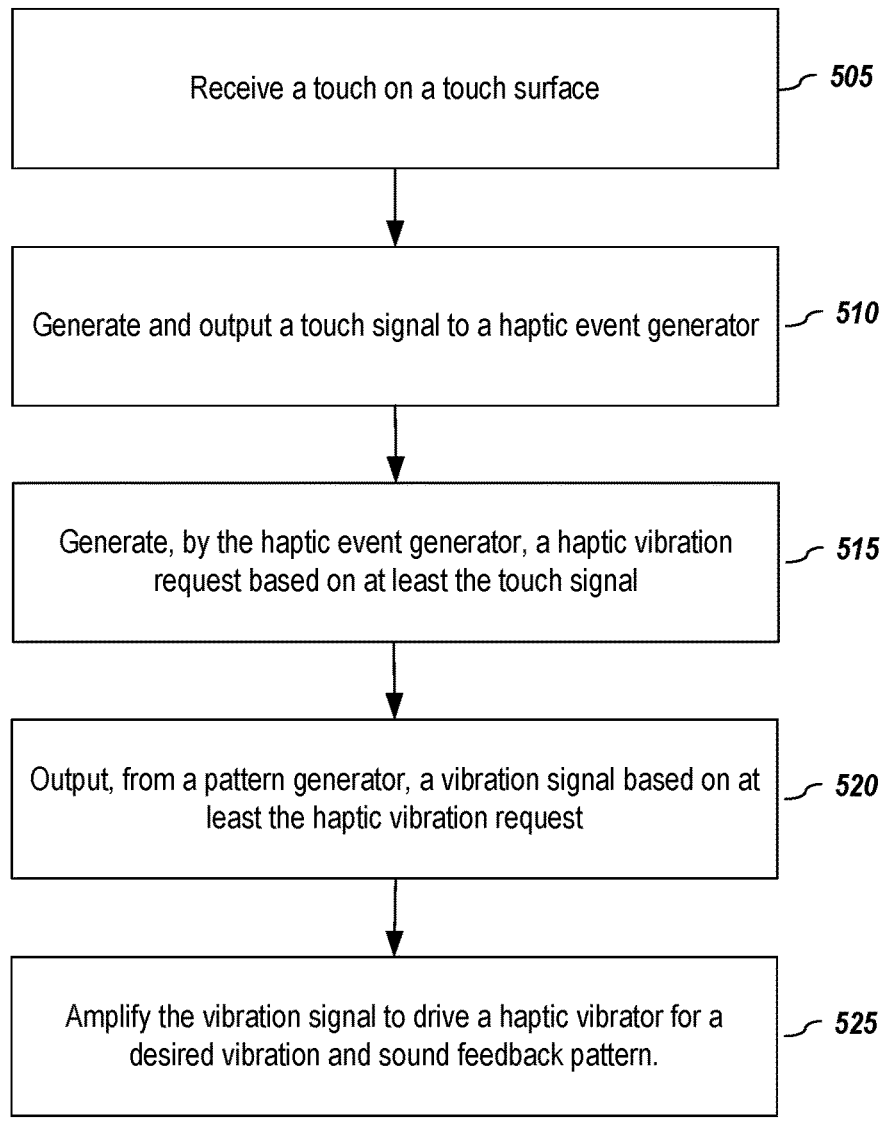
FIG. 5 depicts a flow process of acoustic augmentation for haptic vibration according to various embodiments of the invention.

FIG. 5 depicts a flow process of acoustic augmentation for haptic vibration according to various embodiments of the invention. When a touch is received in step 505 on a touch surface, which may be a touch screen of the electronic device, a projected surface, or a virtual surface, etc. In step 510, a touch signal is generated (by the touch surface itself or other mechanisms) and output to a haptic event generator. In one or more embodiment, the touch signal may comprise information of the software button and the touch information, such as touch force, touch time span.

In step 515, the haptic event generator generates a haptic vibration request based on at least the touch signal. In one or more embodiments, the generation of the haptic vibration request is further based on the user information. In step 520, a pattern generator outputs a vibration signal based on at least the haptic vibration request. In step 525, the vibration signal is amplified by a vibration amplifier to drive a haptic vibrator for a desired vibration and sound feedback pattern.

One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

The invention claimed is:

1. A method for acoustic augmentation of haptic vibration, the method comprising: receiving a touch on a touch surface; generating and outputting a touch signal to a haptic event generator; generating, at the haptic event generator, a vibration request based at least on the touch signal, the vibration request comprises information for desirable vibration and desirable sound; and generating, from a pattern generator, a vibration signal to drive a haptic vibrator for a desired pattern based on at least the vibration request, the vibration signal is a signal across both a vibration band and an acoustic band, the vibration signal in the vibration band and the vibration signal in the acoustic band are generated together and wherein the acoustic band is adjusted in term of a waveform profile separately from the vibration band.

2. The method of claim 1 wherein the haptic vibrator is a linear resonant actuator (LRA).

3. The method of claim 1 wherein the touch signal comprises information of touch area on the touchscreen and information of the touch.

4. The method of claim 1 wherein the pattern generator couples to a pattern database storing a plurality of haptic patterns corresponding to various sounds for one or more haptic vibrators, the pattern generator selects one or more haptic patterns from the pattern database based on the vibration request for the generation of the vibration signal.

5. The method of claim 1 wherein the vibration signal in the vibration band and the vibration signal in the acoustic band are put into different time slots.

6. The method of claim 1 wherein the vibration signal in the vibration band and the vibration signal in the acoustic band are generated independently and synthesized together into the vibration signal.

7. An electronic device comprising: a touch surface to receive a touch and output a touch signal; a haptic event generator to generate a vibration request based at least on the touch signal, the vibration request comprises information for desirable vibration and desirable sound; a pattern generator to generate a vibration signal based on at least the vibration request, the vibration signal is a signal across both a vibration band and an acoustic band, the vibration signal in the vibration band and the vibration signal in the acoustic band are generated together; and a haptic vibrator to receive the vibration signal for a desired pattern and wherein the acoustic band is adjusted in term of a waveform profile separately from the vibration band.

8. The electronic device of claim 7 wherein the haptic vibrator is a linear resonant actuator (LRA).

9. The electronic device of claim 7 wherein the touch signal comprises information of touch area on the touchscreen and information of the touch.

10. The electronic device of claim 7 further comprises a pattern database coupled to the pattern generator, the pattern database storing a plurality of haptic patterns corresponding to various sounds for one or more haptic vibrators, the pattern generator selects one or more haptic patterns based on the vibration request for the generation of the vibration signal.

11. The electronic device of claim 7 wherein the vibration signal in the vibration band and the vibration signal in the acoustic band are put into different time slots.

12. The electronic device of claim 7 wherein the vibration signal in the vibration band and the vibration signal in the acoustic band are generated independently and synthesized together into the vibration signal.

13. A non-transitory computer-readable medium or media comprising one or more sequences of instructions which, when executed by one or more processors, causes the steps for acoustic augmentation of haptic vibration to be performed comprising: generating a touch signal in response to a touch on a touch surface; generating a vibration request based at least on the touch signal, the vibration request comprises information for desirable vibration and desirable sound; and generating a vibration signal to drive a haptic vibrator for a desired pattern based on the vibration request, the vibration signal is a signal across both a vibration band and an acoustic band, the vibration signal in the vibration band and the vibration signal in the acoustic band are generated together and wherein the acoustic band is adjusted in term of a waveform profile separately from the vibration band.

14. The non-transitory computer-readable medium or media of claim 13 wherein the touch signal comprises information of touch area on the touchscreen and information of the touch.

15. The non-transitory computer-readable medium or media of claim 13 wherein the vibration signal in the vibration band and the vibration signal in the acoustic band are put into different time slots.

16. The non-transitory computer-readable medium or media of claim 13 wherein the vibration signal in the vibration band and the vibration signal in the acoustic band are generated independently and synthesized together into the vibration signal.

17. The non-transitory computer-readable medium or media of claim 13 wherein generating the vibration signal to drive the haptic vibrator comprising selecting, based on the vibration request, one or more haptic patterns from a pattern database storing a plurality of haptic patterns corresponding to various sounds for one or more haptic vibrators; and generating the vibration signal to drive the haptic vibrator using the selected one or more haptic patterns.

* * * * *